Aug. 3, 1926.   1,594,408
J. R. EMMERT
CHAIR HEADREST
Filed May 20, 1921
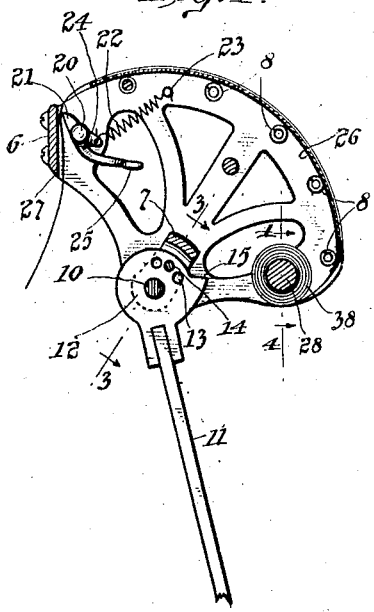
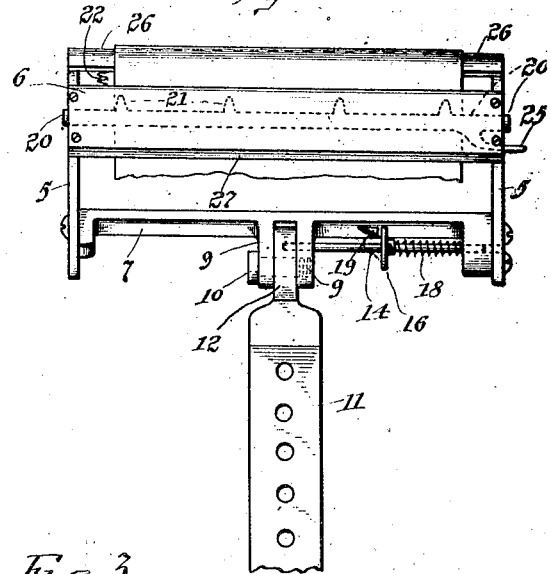
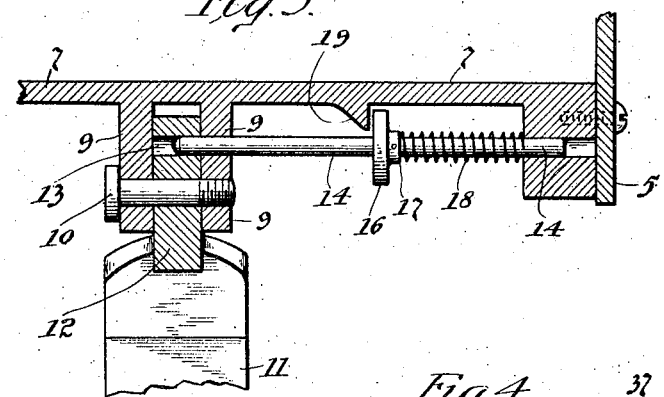
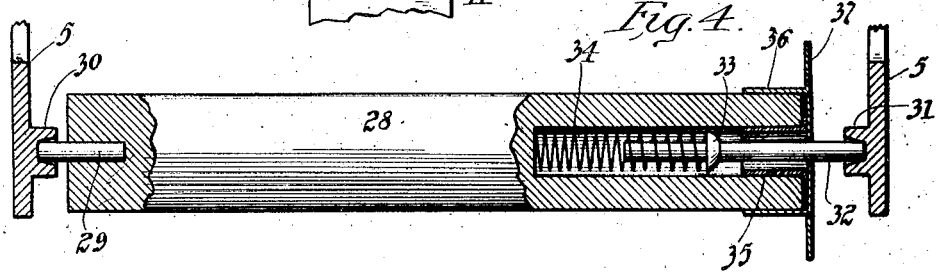
Inventor:
J. Russell Emmert
By Jno. G. Elliott
Atty.

Patented Aug. 3, 1926.

1,594,408

UNITED STATES PATENT OFFICE.

JOHN RUSSELL EMMERT, OF CHICAGO, ILLINOIS, ASSIGNOR TO EMIL J. PAIDAR COMPANY, OF CHICAGO, ILLINOIS, A CORPORATION OF ILLINOIS.

CHAIR HEADREST.

Application filed May 20, 1921. Serial No. 471,178.

This invention relates to improvements in adjustable head rests for chairs and particularly for use in connection with a barber's chair, provided with a spring-actuated bolt for locking it in its adjusted position, heretofore unlocked by a cam-operating device projecting outwardly beyond one end of the head rest, or else by means of a hook-shaped handle projecting rearwardly from the head rest.

The prime object of my invention is to dispense with the use of a cam-operating device projecting outwardly beyond the end of a head rest for withdrawing the spring-actuated bolt for locking the head-rest in its axial adjustment and provide such a bolt with means located within the confines of the ends of the head rest for unlocking said bolt.

With these ends in view, my invention finds embodiment in certain features of novelty in the construction, combination and arrangement of parts by which the said objects are attained, all as hereinafter fully described with reference to the accompanying drawings and more particularly pointed out in the claims.

In said drawings:—

Fig. 1 illustrates in transverse section a head rest in which my invention finds its embodiment.

Fig. 2 is a rear side elevation thereof.

Fig. 3 is an enlarged section taken on the line 3—3 of Fig. 1; and

Fig. 4, an enlarged front elevation of the roller for the paper, partly in section, taken on the line 4—4 of Fig. 1.

As illustrated in the drawings, the openlike opposing end plates 5—5 for the head rest, the flat bar 6, the angular bar 7 and the coiled spring indicated at 8, connecting the end plates 5—5, are constructed and located, as heretofore, in head rests for barbers' chairs, as are also the parallel lugs 9—9, projecting from the bar 7, and the pintle 10, connecting the head rest with the upright shank 11 for its perpendicular adjustment, and the hub 12 provided with perforations 13 adapted to cooperate with a locking bolt 14 for detachably locking the head rest in its horizontal adjustment.

In order, however, to limit the movement of the head rest on its horizontal axis, the hub 12 is provided with a lug 15 adapted to engage the bar 7, so that when the head rest is swung forwardly and downwardly on its horizontal axis, the lug 15 will engage the bar 7 and thereby stop the further downward movement of the head rest as soon as the perforation 13 adjacent the lug is moved to register with the bolt 14.

Bolt 14 has rigidly secured thereto, intermediate its ends, a finger-piece or washer 16, by means of a pin or screw 17, between which plate and the downwardly projecting angular end of the bar 7 is confined the coiled spring 18, normally operating to thrust the bar through any one of the perforations 13 in register with the bearing of the bolt 14 in the lug 9 adjacent thereto, this end-thrust of the bolt being limited by the engagement of the finger-piece or washer 16 with a lug 19, projecting downwardly from the bar 7.

In providing the bolt 14 with a finger-piece located in the position shown in the drawings, my invention not only provides for dispensing with a projection of the bolt through a side bar of the head rest for retracting it from its locking position by means of a thumb-operated cam on the outer end thereof, but for more convenient access to the bolt for its retraction, while at the same time removing from the head rest a heretofore projection, not infrequently engaging with and tearing the garment of the operator.

Flat bar 6, it is to be observed, is immovably secured to the opposing end plates of the head rest and is inwardly longitudinally opposed by a shaft 20 parallel thereto and having its end bearings in plates 5, which shaft is provided at intervals of its length with teeth 21 and is actuated by a coiled spring 22. One end of the spring 22 is secured to a perforated lug 23 on an end plate 5, the other end of the spring being attached to a perforated lug 24 projecting rearwardly from the shaft 20, and whereby the spring 22 normally operates to project the teeth 21 on the shaft to contact with the end of a strip of paper passed between the teeth and the bar 6 for detachably clamping the paper against the bar.

The paper clamping shaft 20 is provided with a handle 25 projecting through one of the openings formed in the end plate 5 for releasing the paper from the grip of the teeth 21 of the shaft 20, as may be, by pressing the handle downwardly against the resistance of the spring, the downward movement of the handle being stopped by the opposing wall of the slot.

The construction above described provides for rigidly connecting and spacing the end plates of a head rest by means of the perfectly flat bar 6, which may be beveled at its lower edge, as indicated at 27, to provide a severing edge for the paper and at the same time a fixed jaw for teeth mounted upon a shaft automatically actuated to clamp the free end of a strip of paper overlying the usual spring-actuated leather or textile cover 26 commonly applied to head rests of this character, the paper roll for which purpose is supported by a roller 28, as indicated in Fig. 1.

This roller is provided at one end with a fixed pin 29 adapted to have its bearing in a boss 30 formed on one of the end plates 5, and for the purpose of its connection with and bearing in a boss 31 on the other plate 5 is bored out to receive a pintle 32, provided intermediate its ends with a fixed collar 33, against which and against the closed end of the bored-out portion abuts a compression coiled spring 34, the outward movement of the pintle 32 being limited by the end edge of a flanged eyelet 35. The outer flanged end of the eyelet 35 is enclosed by a cap 36 circumferentially surrounding the roller and in which the pintle 32 has its bearing, which cap plate is provided with a circular flange 37, preferably formed integrally therewith for opposing the adjacent end of a roll of paper 38 sleeved upon the roller and forming a stop, preventing an endwise movement of the roll of paper when inserting the roller to its operative position.

By reference to Fig. 4, it will now be understood that when the roller is disconnected from its end bearings, the spring 34 will force the pintle 32 outwardly and its collar 33 against the end of the flanged eyelet 35, and that for inserting the roller in its operative position, after sleeving a roll of paper thereon, followed by placing the end of the pintle 32 in its bearing 31, and then taking hold of the paper roll and pulling it forcibly against the flange, the spring will be compressed sufficiently by the collar for the fixed pin 29 to pass across its bearing and enter the same upon releasing the roll, and that in the meantime the flange 37 will prevent the paper roll from being pulled outwardly beyond the adjacent end of the roller.

The essential function of the cap 36 is to support the flange 37 for the end of the roll and not necessarily to provide a bearing for the pintle 32, for the reason that such a bearing might be formed in the outer end of the eyelet 35, the important function of which is to provide a stop limiting the outward thrust of the pintle.

A paper-supporting roller, constructed as above described, for use in connection with an adjustable head rest, is an important feature of my invention in that it is yieldably adjustable in its bearings; that it may be conveniently and quickly inserted and secured in its operative position, without the employment of any devices projecting outwardly from the end plates 5 of a head rest, as, for example, when one of its end bearings is internally screw-threaded to receive a thumb-screw passing through the end plate, requiring, as it does, considerable time and patience for registering the thumb-screw with the screw-threads in the roller, and, besides, which thumb-screw furthermore mars the appearance of the head rest, renders the bearing of the roller unyielding, and, besides, projecting, as it does, outwardly beyond the surface of the end plate, has a tendency to obstruct the movement of the operator of a barber's chair while shaving the occupant.

It is essential, for rapid and effective work by a barber, a dentist and a surgeon operating upon the face or head of the occupant of a chair, that the devices for adjusting the head rest therefor shall be free from any projections tending to obstruct the movement of either the body or hands of the occupant; that the devices for operating the several adjustments of a head rest shall be conveniently and quickly accessible; that they shall not present projections tending or liable to obstruct the movement of either the body or the hands of the operator, and that the applied force for their operation shall be reduced to a minimum. It will now be apparent that it is to securing these several advantages that my invention is directed.

Having described my invention, what I claim and desire to secure by Letters Patent is:—

1. The combination with an adjustable head rest having end plates, of a support located between and fixed to said plates, provided with a perforation adjacent one end, the outer end of which perforation is closed by the plate opposed thereto, and with another inwardly located perforation, a locking bolt located in a plane parallel to the axis of the head rest slidable in said perforations, the outward thrust of which bolt is limited by said plate, and means for manually actuating said bolt.

2. The combination with an adjustable head rest having end plates, of a support located between and fixed to said plates, provided with a perforation adjacent one end, the outer end of which is closed by the plate opposed thereto, and with another inwardly located perforation, a locking bolt located in a plane parallel to the axis of the head rest slidable in said perforations, the outward thrust of which bolt is opposed by said plate, and a finger-piece secured to the bolt intermediate its end.

3. The combination with a head rest, of means for adjusting said head rest on a horizontal axis, a sliding bolt parallel to said axis located within the confines of the head rest for locking the head rest in any one of its several adjusted positions, a finger piece surrounding and secured to said bolt intermediate its ends, a coiled spring opposed to said finger piece, resisting the unlocking movement of the bolt, and a fixed stop in the path of movement of the finger piece.

4. The combination with an adjustable head rest, having end plates, of a support located between and fixed to said plates, provided with a perforation adjacent one end, the outer end of which perforation is closed by the opposing plate, and with another inwardly located perforation, a locking bolt located in a plane parallel to the axis of the head rest slidable in said perforations, said support being provided with a stop limiting the inward movement of the bolt.

5. The combination with an adjustable head rest having end plates, of a support located between and fixed to said plates, provided with a perforation adjacent one end, the outer end of which perforation is closed by a plate opposed thereto, and with another inwardly located perforation, a locking bolt located in a plane parallel to the axis of the head rest slidable in said perforations, a finger-piece secured to said bolt intermediate its ends, a spring for automatically actuating said bolt to its locking position, and a stop projecting from the support limiting the inward movement of the bolt against the force of the spring.

6. The combination with an adjustable head rest having end plates, of a support located between and fixed to said plates, provided with a perforated lug adjacent one end, the outer end of which perforation is closed by the plate opposed thereto, and with another perforated lug inwardly therefrom, a locking bolt located in a plane parallel to the axis of the head rest slidable in said perforations, a finger-piece for retracting the bolt, and a stop secured to said support limiting the locking movement of said bolt.

In witness whereof, I have hereunto set my hand this 16th day of May, 1921.

JOHN RUSSELL EMMERT.